US012431302B2

(12) United States Patent
Olabi et al.

(10) Patent No.: US 12,431,302 B2
(45) Date of Patent: Sep. 30, 2025

(54) ASYMMETRIC SUPERCAPACITOR

(71) Applicant: UNIVERSITY OF SHARJAH, Sharjah (AE)

(72) Inventors: Abdul Ghani Olabi, Sharjah (AE); Mohammad Ali, Sharjah (AE); Pragati Ankush Shinde, Sharjah (AE)

(73) Assignee: UNIVERSITY OF SHARJAH, Sharjah (AE)

( * ) Notice: Subject to any disclaimer, the term of this patent is extended or adjusted under 35 U.S.C. 154(b) by 0 days.

(21) Appl. No.: 19/016,362

(22) Filed: Jan. 10, 2025

(65) Prior Publication Data

US 2025/0149264 A1    May 8, 2025

Related U.S. Application Data

(62) Division of application No. 18/122,403, filed on Mar. 16, 2023, now Pat. No. 12,224,118.

(51) Int. Cl.
   *H01G 11/86* (2013.01)
   *H01G 11/32* (2013.01)

(52) U.S. Cl.
   CPC ............. *H01G 11/86* (2013.01); *H01G 11/32* (2013.01)

(58) Field of Classification Search
   None
   See application file for complete search history.

(56) References Cited

U.S. PATENT DOCUMENTS

| | | | |
|---|---|---|---|
| 10,622,163 B2 | 4/2020 | Kaner | |
| 10,734,167 B2 | 8/2020 | El-Kady | |
| 11,996,238 B2 | 5/2024 | Olabi | |
| 2016/0104582 A1 | 4/2016 | Wang | |
| 2018/0233297 A1 | 8/2018 | Zhamu | |
| 2023/0238189 A1 | 7/2023 | Olabi | |

FOREIGN PATENT DOCUMENTS

| | | | | |
|---|---|---|---|---|
| CA | 3018568 A1 | 9/2017 | | |
| CN | 108766776 A | 11/2018 | | |
| CN | 109216048 A | 1/2019 | | |
| CN | 109449005 B | * 9/2021 | ............. | B82Y 30/00 |
| CN | 113711418 A | * 11/2021 | ............. | H01G 11/02 |
| KR | 20190123905 A | 11/2019 | | |

OTHER PUBLICATIONS

Cao et al. "Tunable agglomeration of Co3O4 nanowires as the growing core for in-situ formation of Co2NiO4 assembled with polyaniline-derived carbonaceous fibers as the high-performance asymmetric supercapacitors", Journal of Alloys and Compounds 853 157210, (2021), 9 pages. (Year: 2021).
Zhao et al. "Hierarchical ferric-cobalt-nickel ternary oxide nanowire arrays supported on graphene fibers as high-performance electrodes for flexible asymmetric supercapacitors", Nano Research 11(4), (2018), 12 pages. (Year: 2018).
Wu et al. "Rational design of cobalt-nickel double hydroxides for flexible asymmetric supercapacitor with improved electrochemical performance", Journal of Colloid and Interface Science 581, (2021), 10 pages. (Year: 2021).
Huang et al. "High performance asymmetric supercapacitor based on hierarchical flower-like NiCo2S4@polyaniline", Applied Surface Science 487, (2019), 9 pages. (Year: 2019).
Ge et al. "Hierarchical PANI/NiCo-LDH Core-Shell Composite Networks on Carbon Cloth for High Performance Asymmetric Supercapacitor", Nanomaterials 9 527, (2019), 15 pages. (Year: 2019).
Narayanasamy et al. "Carbon cloth/nickel cobaltite (NiCo2O4)/polyaniline (PANI) composite electrodes: Preparation, characterization, and application in microbial fuel cells", Fuel 301, (2021), 15 pages. (Year: 2021).
Waseem Raza, "Recent Advancements in Supercapacitor Technology", Journal, 2018, 441-473, vol. 52, Nano Energy.
Zenan Yu, "Supercapacitor Electrode Materials: Nanostructures from 0 to 3 Dimensions", Journal, 2015, 677-1048, vol. 8, Energy & Environmental Science.
Yang Zhou, "Two-Birds-One-Stone: Multifunctional Supercapacitors Beyond Traditional Energy Storage", Journal, 2021, 1854-1896, vol. 14, Energy & Environmental Science.
Lili Liu, 2016, "Unconventional Supercapacitors from Nanocarbon-Based Electrode Materials to Device Configurations", Journal, 2016, 4340-4363, vol. 45, Chemistry Society Review.
Yu Liu, "Recent Advances of Supercapacitors Based on Two-Dimensional Materials", Journal, 2017, 104-115, vol. 8, Applied Materials Today.
Yu Zhong, "Transition Metal Carbides and Nitrides in Energy Storage and Conversion", Article, 2016, 1-28, vol. 3, Advanced Science.
Y. Cheng, "Improving the Performance of Cobalt-Nickel Hydroxides-Based Self-Supporting Electrodes in Supercapacitors in Accumulative Approaches", Journal, 2013, 1-17, vol. 3, Energy & Environmental Science.
Michael Naguib, "Two-Dimensional Transition Metal Carbides", Article, 2012, 1322-1331, vol. 6, ACS Nano.

(Continued)

*Primary Examiner* — Eric W Thomas
(74) *Attorney, Agent, or Firm* — MH2 Technology Law Group, LLP

(57) ABSTRACT

A structure of an asymmetric supercapacitor and a preparation method thereof is disclosed. In some implementations, the preparation comprises the steps of forming a polyaniline (PANI) nanowire on carbon cloth (CC) substrate (PANI/CC) by polymerization of an aniline, depositing a cobalt-nickel layer double hydroxides (CoNi-LDHs) on the PANI/CC by a hydrothermal process, and calcining of the cobalt-nickel layer double hydroxides (CoNi-LDHs) in the PANI/CC at a high temperature to form a metal carbide (CoC@NiC) on the carbon cloth. The structure of the asymmetric supercapacitor includes a metal carbide (CoC@NiC) as a positive electrode, a tungsten trioxide (WO$_3$@C) as a negative electrode, and a poly (vinyl alcohol)/Potassium hydroxide (PVA/KOH) as an electrolyte gel.

6 Claims, 5 Drawing Sheets

(56) References Cited

OTHER PUBLICATIONS

S.T. Oyama, "Introduction to the Chemistry of Transition Metal Carbides and Nitrides", Abstract, 1996, 1-29, Department of Chemical Engineering, Virginia Polytechnic Institute & State University, Blacksburg, Virginia, © Chapman & Hall.
Liliang Chen, "Synthesis of Novel CoCx@C Nanoparticles", Article, 2013, 1-11, vol. 24, Nanotechnology.
Songphon Phimsen, "Nickel Sulfide, Nickel Phosphide and Nickel Carbide Catalysts for Bio-Hydrotreated Fuel Production", Journal, 2017, 324-333, vol. 151, Energy Conservation and Management.
Issa Kone, "In Situ Growth of Co4N Nanoparticles-Embedded Nitrogen-Doped Carbon Nanotubes on Metal-Organic Framework-Derived Carbon Composite as Highly Efficient Electrocatalyst for Oxygen Reduction and Evolution Reactions", Article, 2020, 1-10, vol. 8, Energy Technology.
Pragati A. Shinde, "Nitridation-Induced in Situ Coupling of Ni—Co4N Particles in Nitrogen-Doped Carbon Nanosheets for Hybrid Supercapacitors", Journal, 2022, 1-9, vol. 428, Chemical Engineering Journal.
R. J. J. Jansen, "Xps of Nitrogen-Containing Functional Groups on Activated Carbon", Abstract, 1995, 1021-1027, vol. 33, Carbon, @ Elsevier Science Ltd.
Deepak P. Dubal, "Nickel Cobaltite as an Emerging Material for Supercapacitors: An Overview", Journal, 2015, 677-399, vol. 11, Nano Energy.
Guangdi Nie, "Flexible Supercapacitor of High Areal Performance with Vanadium/Cobalt Oxides on Carbon Nanofibers as a Binder-Free Membrane Electrode", Journal, 2020, 1-8, vol. 402, Chemical Engineering Journal.

\* cited by examiner

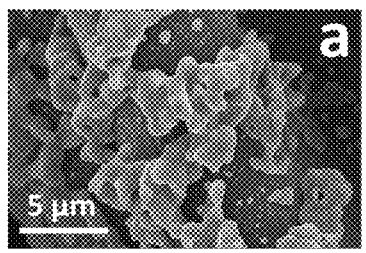 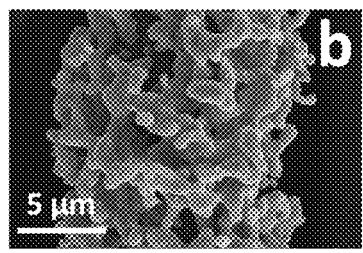 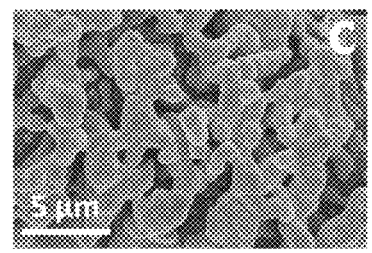
Fig. 5(a)   Fig. 5(b)   Fig. 5(c)
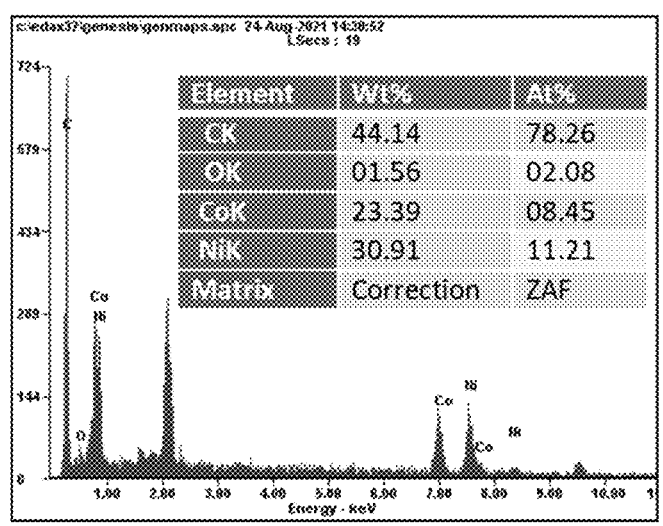
Fig. 6
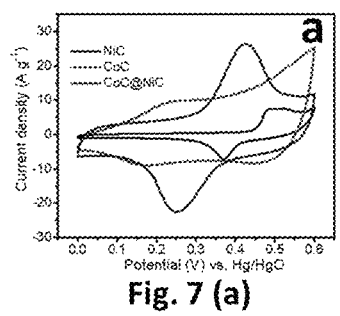 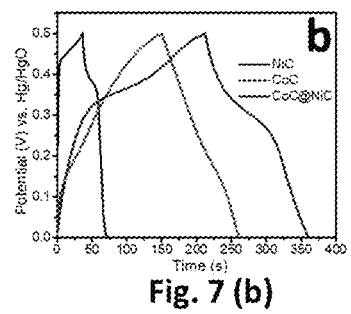 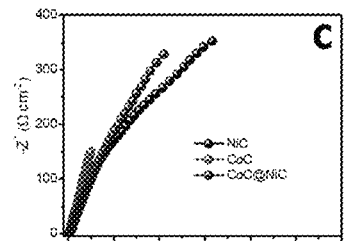
Fig. 7 (a)   Fig. 7 (b)   Fig. 7 (c)
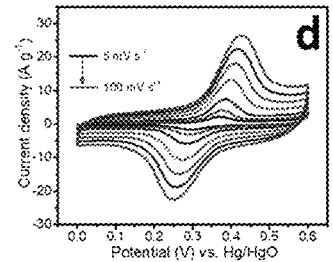 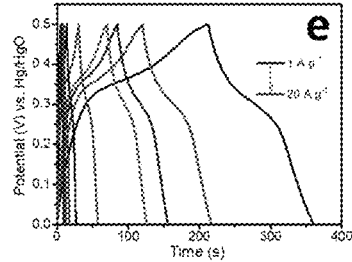 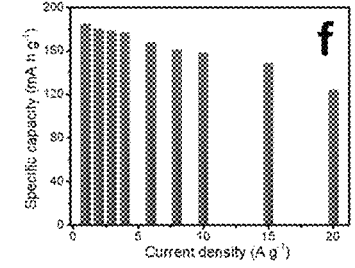
Fig. 7 (d)   Fig. 7 (e)   Fig. 7 (f)

ASYMMETRIC SUPERCAPACITOR

CROSS REFERENCE TO RELATED APPLICATION

This application is a divisional of U.S. application Ser. No. 18/122,403 filed 16 Mar. 2023, the entire disclosure of which is incorporated herein by reference.

FIELD OF THE INVENTION

Embodiments of the present invention relate to the electrode materials of a supercapacitor. They more particularly relate to a structure of an asymmetric supercapacitor and a method for preparing the asymmetric supercapacitor with ultrahigh energy, power performance, and high cycling stability.

BACKGROUND OF THE INVENTION

Energy scarcity from sustainable renewable energy sources has been the top research priority in the period of energy scarcity. Alongside this, many systems and methods are developed for storing energy obtained from these resources in the proper energy storage device.

Supercapacitors (SCs) are one of the leading and most efficient energy storage devices that bridge the gap between traditional capacitors and rechargeable batteries. SCs possess various promising features, such as high-power density, high-rate capability, high energy density, long-term cyclic durability, fast charge and discharge rates, low cost, easy maintenance, and environment-friendly.

The SCs are newly developed energy storage devices that are environmentally friendly, have great electrochemical performance, and are specially made for quick power supply for miniaturized devices, consumer electronic products, communications, medical equipment, and hybrid electric vehicles. Over the last few decades, many methods of preparing the SCs have steadily expanded and created a variety of nanostructured synthetic materials for use in SCs.

The developing nanoengineered materials, energy-storing capacity, and chemistry involved have become one of the hotspots of interdisciplinary research. Even though they have enormous potential and opportunities, supercapacitor face many challenges. Finding the appropriate electrode materials to boost the energy storage capacity of present supercapacitors close to the Li-ion batteries is challenging.

Transition metal carbides have great potential for energy storage applications due to their structural stability, high conductivity, and high electrochemical activity. Until now, TiC, $MoC_2$, WC, and VC have been demonstrated and used for SCs. Cobalt and nickel-based materials show their excellent performance as an electrode for high-energy SCs.

Another example is CN108766776B, which discloses a carbon cloth-based flexible supercapacitor electrode material system preparation method. The preparation method comprises the steps of cleaning a commercial carbon cloth, putting the cleaned commercial carbon cloth into a mixed aqueous solution of nickel nitrate, cobalt nitrate and urea to perform hydrothermal reaction in a reaction kettle, performing cleaning and drying treatment, calcining in an air atmosphere to obtain a carbon cloth with a nickel cobaltate nanoneedle array, putting the carbon cloth into a dimethyl formamide solution of ammonium tetrathiotungstate to perform a second hydrothermal reaction in the reaction kettle, performing cleaning and drying treatment, and calcining in a nitrogen atmosphere to successfully prepare a nickel cobaltate and tungsten disulfide core-shell nanowire-loaded flexible electrode material. The invention has simple manufacturing process, can be directly used as an electrode without a binder and a conductive agent when loaded on a flexible carbon cloth substrate, greatly improves the capacitance performance by compounding the double electric layers and the pseudo capacitor, has higher specific capacitance and has better development prospect in the future energy storage field.

But the above-disclosed patent has some disadvantages. The above preparation method discloses the nickel nitrate, cobalt nitrate, and urea that are dissolved in DI water and transferred to a reaction kettle with carbon cloth substrate hydrothermal reaction for 4-20 hours at 100-180° C. The prepared material on carbon cloth is annealed for 1-6 hours air atmosphere at 300-500° C. to form NiCo2O4. But the above patent does not disclose the fabrication of the supercapacitor and the metal carbide that is prepared by the simple and cost-effective method.

Another example is KR20190123905A discloses an electrode for a supercapacitor, including the same and a manufacturing method. The electrode for a supercapacitor is excellent in weight, volume, area, and length capacitance and is suitable as a power device of a smart wearable device. The electrode for a supercapacitor comprises a wire-type transition metal substrate; a three-dimensional porous transition metal layer surrounding the transition metal substrate; and a three-dimensional layered double hydroxide nanostructure layer formed on the three-dimensional porous transition metal layer.

The above method discloses a synthesis of Polyaniline-loaded aluminum-doped manganese dioxide (PANI @ Al—$MnO_2$). The supercapacitor is fabricated in the above method. The supercapacitor structure includes a PANI @ Al—$MnO_2$@CC as an anode, a PANI @ Al—$MnO_2$@ CC as a cathode, and a PVA/Na2SO4 as an electrolyte gel. The above method does not disclose the synthesis of the metal carbide.

However, no patent discloses cobalt and nickel carbides preparation and electrochemical performance evaluation. Both cobalt and nickel carbide possesses various valuable properties, such as high electronic conductivity and excellent thermal, mechanical, and chemical stability. The different properties of materials play an essential role in the performance of SCs, such as the surface area, morphology, redox chemistry, and structure that strongly affect the electrochemical performance.

In order to overcome the drawbacks mentioned above, there is a need to develop a cobalt carbide@nickel carbide (CoC@NiC) nanoarrays on carbon cloth via the final carbonization of precursor template under nitrogen flow at a high temperature of 800° C. The prepared electrode possesses heteroatoms, enriching electrochemical performance and electrochemically active sites. Benefiting from all these promising features, the resultant CoC@NiC electrode shows high electrochemical performance. Furthermore, flexible solid-state asymmetric supercapacitors (ASCs) are constructed with a CoC@NiC and $WO_3$@C as cathode and anode, respectively, demonstrating high specific energy and high cycling stability.

SUMMARY OF THE INVENTION

An embodiment of the present disclosure relates to a preparation method of an asymmetric supercapacitor. In one general aspect, the preparation method may include multiple steps. In the first step, a polyaniline (PANI) nanowire is formed on a carbon cloth (CC) substrate (PANI/CC) by polymerization of aniline. In the next step, a cobalt-nickel layer of double hydroxides (CoNi-LDHs) is deposited on the PANI/CC by a hydrothermal process. In the last step, the cobalt-nickel layer double hydroxides (CoNi-LDHs) is calcined in the PANI/CC at a high temperature (800° C.) to form a metal carbide (CoC@NiC) on the carbon cloth. Other embodiments of this aspect include corresponding architecture, apparatus, and computer programs recorded on one or more storage devices, each configured to perform the actions of the methods.

Following an embodiment of the present invention, the preparation method includes the polyaniline (PANI) nanowires used as a primary carbon source.

In accordance with an embodiment of the present invention, the metal carbides (CoC@NiC) is used as an electrode for the asymmetric supercapacitor. Further, a testing process of the metal carbide (CoC@NiC) electrode shows a maximum specific capacity of 184 mA h g-1 at a current density of 1 A g-1.

In accordance with an embodiment of the present invention, the metal carbide (CoC@NiC) electrode shows high electrochemical performance.

In accordance with an embodiment of the present invention, at least three heteroatoms such as Co, Ni, and C in a unique structure of the metal carbide (CoC@NiC) electrode, offers numerous oxidation states. Further, the metal carbide (CoC@NiC) electrode offers multiple electroactive sites and expressways for electron diffusion or transportation.

In accordance with an embodiment of the present invention, a stacked design of the metal carbide (CoC@NiC) architectures directly on the carbon cloth (CC) substrate reduces a dead volume and resistance arising from additives.

In accordance with an embodiment of the present invention, the method includes a temperature-dependent phase transition to convert the layered cobalt-nickel layer double hydroxides (CoNi-LDHs) deposited on the PANI/CC into a highly conductive metal carbide (CoC@NiC).

In accordance with an embodiment of the present invention, the preparation method of the metal carbides (CoC@NiC) reduces the electronic states of the metal carbide (CoC@NiC) electrode and improves electrical conductivity. The described techniques' implementation may include hardware, a method or process, or a tangible computer medium.

In one general aspect, a structure of an asymmetric supercapacitor includes a positive electrode, a negative electrode and an electrolyte gel. The positive electrode is a metal carbide (CoC@NiC). The negative electrode is a tungsten trioxide ($WO_3$@C). The structure may include the electrolyte gel, a poly (vinyl alcohol)/Potassium hydroxide (PVA/KOH).

In accordance with an embodiment of the present invention, the asymmetric supercapacitors work in a high voltage range of 0-1.6 Volt (V), and deliver a high specific energy of 83.55 Wh $kg^{-1}$ at a specific power of 2048 W $kg^{-1}$.

In accordance with an embodiment of the present invention, the asymmetric supercapacitors show a higher cycle life with a capacity retention of 91.3% over 10,000 cycles. Further, asymmetric supercapacitors offer high cycling stability.

In accordance with the embodiment of the present invention, a columbic efficiency of the asymmetric supercapacitors is about 100%. Further, the asymmetric supercapacitors provide fast charging, ultrahigh energy density, and ultrahigh power density.

In accordance with the embodiment of the present invention, asymmetric supercapacitors is used in many real-time applications, including solar energy storage, portable electronic device, automobile, transportation device, and similar.

The foregoing objectives of the present invention are to provide a flexible solid asymmetric supercapacitor structure that is highly conductive and offers high performance with ultrahigh energy and power performance and high cycling stability. This is a self-supported integrated structure of an electrode consisting of the cobalt carbide and nickel carbide together in a single electrode.

BRIEF DESCRIPTION OF THE DRAWINGS

So that the manner in which the above-recited features of the present invention are understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 5(a), 5(b) and 5(c) display the FESEM images of the NiC, CoC CoC@NiC architectures following carbonization under a nitrogen atmosphere, respectively, in accordance with an embodiment of the present invention.

FIG. 6 illustrates an EDS spectrum for the CoC@NiC, in accordance with an exemplary embodiment of the present invention.

FIGS. 7(a), 7(b), and 7(c) is a comparative curve for a CV, a GCD, and an EIS plots for the NiC, the CoC, and the CoC@NiC electrodes respectively at the same scan rate and current density, 7 (d) illustrates a CV curve for the CoC@NiC electrode at different scan rates, 7(e) shows a GCD curves for the CoC@NiC electrode at different current densities and 7(f) plot of the variation of specific capacity with respect to current density, in accordance with an embodiment of the present invention.

DETAILED DESCRIPTION

The present invention relates to a structure of an asymmetric supercapacitor and a method for preparation of the asymmetric supercapacitor. Flexible solid-state asymmetric SCs have been fabricated with a metal carbide (CoC@NiC) nanoarrays as an anode or a positive material and a $WO_3$@C as a cathode or a negative electrode. The fabricated ASCs exhibit excellent electrochemical performance, a large operating potential window, and high cycling stability.

The principles of the present invention and their advantages are best understood by referring to FIG. 1 to FIG. 9. In the following detailed description of illustrative or exemplary embodiments of the disclosure, specific embodiments in which the disclosure may be practiced are described in sufficient detail to enable those skilled in the art to practice the disclosed embodiments. The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

Figure 1:
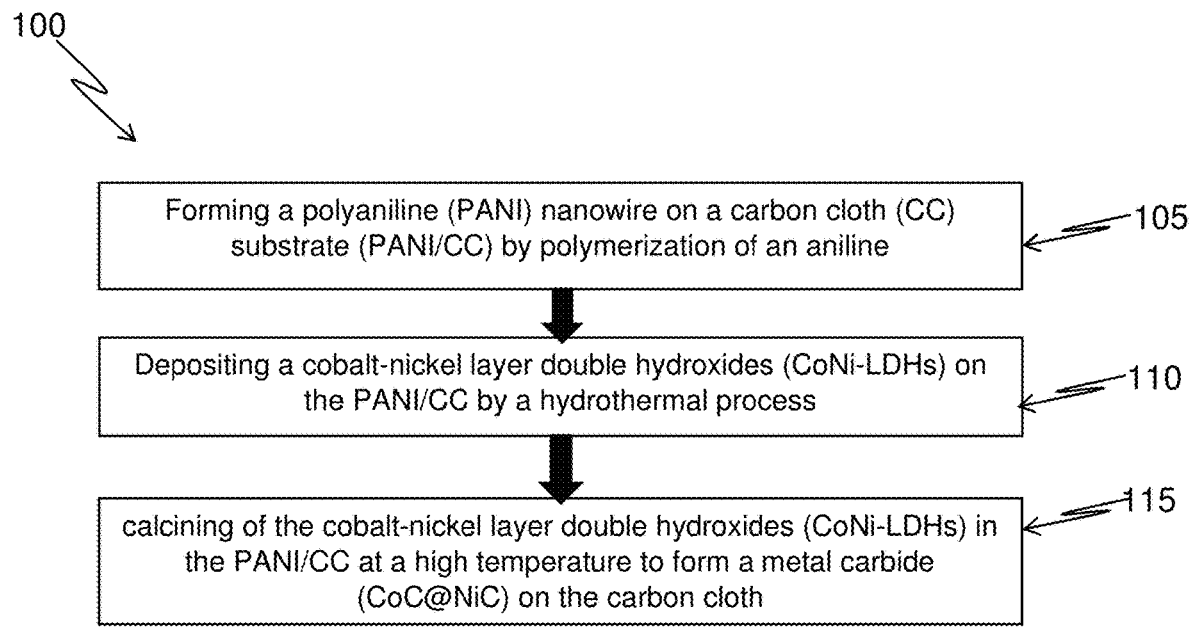
FIG. 1 is a block diagram illustrating a method for the preparation of an asymmetric supercapacitor according to an embodiment of the present invention.

FIG. 1 is a block diagram illustrating a method preparation of asymmetric supercapacitors, according to an embodiment of the present invention. The methods include a polyaniline (PANI) nanowire, a carbon cloth (CC) substrate, an aniline, a cobalt-nickel layer double hydroxides (CoNi-LDHs), and a metal carbide (CoC@NiC).

In the method, the polyaniline (PANI) nanowire is formed on the carbon cloth (CC) substrate (PANI/CC) by polymerization of the aniline, as shown in step 105. Further, The cobalt-nickel layer double hydroxides (CoNi-LDHs) is deposited on the PANI/CC by a hydrothermal process, as shown in step 110. Additionally, the cobalt-nickel layer double hydroxides (CoNi-LDHs) is calcined in the PANI/CC at a high temperature (800° C.) to form a metal carbide (CoC@NiC) on the carbon cloth, as shown in step 115. Other embodiments of this aspect include corresponding architecture, apparatus, and computer programs recorded on one or more storage devices, each configured to perform the actions of the methods.

In accordance with an embodiment of the present invention, the preparation method includes the polyaniline (PANI) nanowires used as a main carbon source. In accordance with an embodiment of the present invention, the metal carbide (CoC@NiC) electrode shows high electrochemical performance. In accordance with an embodiment of the present invention, the metal carbides (CoC@NiC) are used as an electrode for the asymmetric supercapacitor. Further, a testing process of the metal carbide (CoC@NiC) electrode shows a maximum specific capacity of 184 mA h g$^{-1}$ at a current density of 1 A g$^{-1}$.

In accordance with an embodiment of the present invention, at least three heteroatoms such as Co, Ni, and C in a unique structure of the metal carbide (CoC@NiC) electrode offer numerous oxidation states. Further, the metal carbide (CoC@NiC) electrode offers multiple electroactive sites and expressways for electron diffusion or transportation.

In accordance with an embodiment of the present invention, a stacked design of the metal carbide (CoC@NiC) architectures directly on the carbon cloth (CC) substrate reduces a dead volume and resistance arising from additives. In accordance with an embodiment of the present invention, the method includes a temperature-dependent phase transition to convert the layered cobalt-nickel layer double hydroxides (CoNi-LDHs) deposited on the PANI/CC into a highly conductive metal carbide (CoC@NiC).

In accordance with an embodiment of the present invention, the preparation method of the metal carbides (CoC@NiC) reduces the electronic states of the metal carbide (CoC@NiC) electrode and improves an electrical conductivity.

In accordance with another embodiment of the present invention, a structure of an asymmetric supercapacitor includes a positive electrode, a negative electrode and an electrolyte gel. The positive electrode is a metal carbide (CoC@NiC). The negative electrode is a tungsten trioxide (WO3@C). The structure may include the electrolyte gel that is a poly (vinyl alcohol)/Potassium hydroxide (PVA/KOH).

In accordance with an exemplary embodiment of the present invention, a synthesis of the polyaniline (PANI) on the carbon cloth (PANI/CC) substrate is disclosed. An Ammonium persulfate is used to polymerize the aniline to form the PANI on the carbon cloth (CC). The well cleaned CC (2 cm×3 cm) is immersed in a 50 mL of mixture solution of 1 M H2SO4 and 0.55 mL aniline placed in an ice bath under magnetic stirring. 50 mL of 1 M $H_2SO_4$ containing 0.545 g ammonium persulfate is added dropwise to the above mixture solution. Later, the reaction mixture is placed for 5 h in the same ice bath. After the reaction, the green color PANI deposited on the CC is washed several times with DI water and acetone and dried overnight at 60° C. before further use.

In accordance with another exemplary embodiment of the present invention, a synthesis of a nickel-cobalt precursors on the PANI/CC (NiCo@PANI/CC) is disclosed. The reaction solution is prepared by adding 0.05 M Ni(NO$_3$)$_2$·6H$_2$O, 0.05 M Co(NO$_3$)$_2$·6H$_2$O, 0.2 M NH4F and 0.4 M CO(NH$_2$)$_2$ in 40 mL of DI water. The solution is poured into the Teflon-liner stainless-steel autoclave. A piece of PANI/CC (2 cm×3 cm) is immersed into the Teflon liner and the autoclave is subjected to the hydrothermal process at 120° C. for 12 h. After the autoclave cooled down to room temperature, NiCo@PANI/CC is removed, washed thoroughly with the DI water and acetone, and dried at 60° C. overnight. The Ni@PANI/CC and Co@PANI/CC is separately prepared for comparison by the same process described above.

In accordance with another exemplary embodiment of the present invention, a synthesis of the cobalt carbide@nickel carbide (CoC@NiC) nanoarrays on the carbon cloth is disclosed. The CoC@NiC is prepared through carbonization of NiCo@PANI/CC precursor. In a typical synthesis, the prepared NiCo@PANI/CC substrate is subjected to the hydrothermal process in a tubular furnace at a high temperature (800° C.) for 2 h at the heating rate of 5° C./min under the mixture nitrogen flow (10 sccm). Then, the sample is allowed to cool naturally at room temperature. A CoC and NiC sample is prepared on the carbon cloth from the Co@PANI/CC and Ni@PANI/CC precursors.

Figure 2:
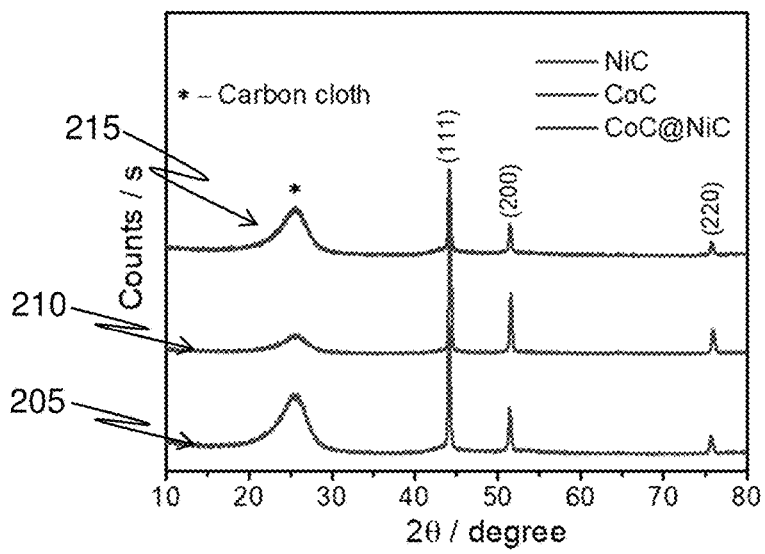
FIG. 2 illustrates an XRD pattern for a NiC (205), a CoC (210), and a CoC@NiC (215), in accordance with an embodiment of the present invention.

FIG. 2 illustrates an XRD pattern for the NiC (205), the CoC (210), and the CoC@NiC (215), in accordance with an embodiment of the present invention. In the present invention. The PANI is a main carbon source to form the metal carbides on the CC substrate. The bimetallic CoC@NiC arrays are prepared through the carbonization of Ni—Co hydroxides developed on the PANI-covered the CC. Firstly, the PANI nanowires are grown on the CC substrate through the simple polymerization of aniline in the ice bath.

Further, the nickel-cobalt (Ni—Co) precursors is grown on the PANI-coated CC under the one-step hydrothermal process. Finally, the obtained materials are calcined in a tubular furnace under an $N_2$ atmosphere at different 800° C. The formation of the metal carbides from the Ni—Co precursors takes place inside the tube furnace. Following the calcination treatment, the NiCo@PANI/CC precursor is converted into CoC@NiC nanoarchitecture.

The crystallographic analysis of prepared samples is inspected with the X-ray diffraction (XRD) pattern. All the diffraction peaks in the pattern are matches with cubic CoC and a cubic NiC phases. The diffraction peaks of the CoC phase and NiC phase overlap in the CoC@NiC. No additional peaks corresponding to any other phases are seen in the pattern reflecting the purity of obtained phase.

Figure 3A:
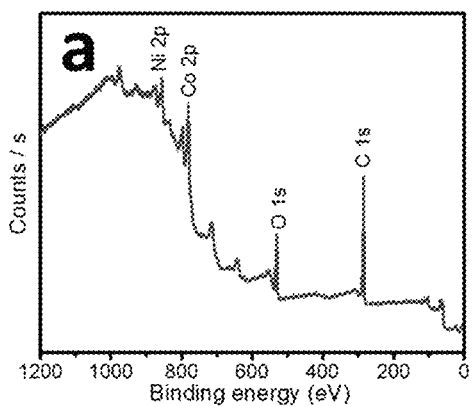
FIGS. 3(a), 3(b), 3(c), and 3(d) illustrate the XPS spectra of the CoC@NiC sample in accordance with an embodiment of the present invention.
Figure 3B:
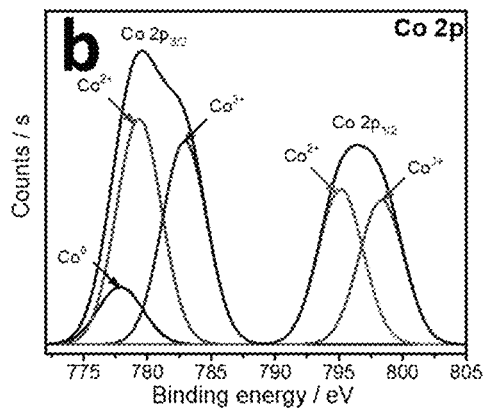
Figure 3C:
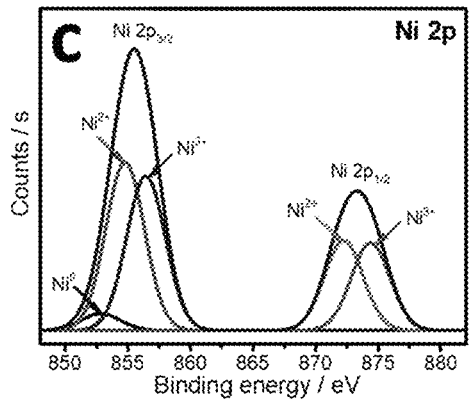
Figure 3D:
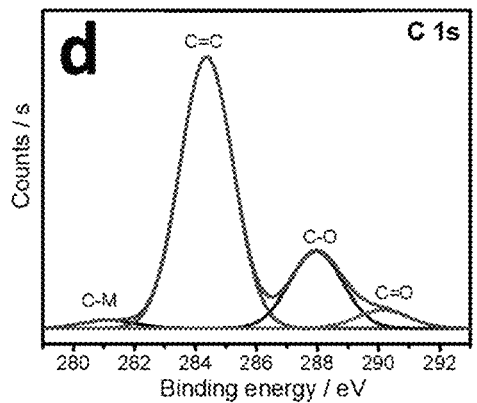

FIGS. 3(a), 3(b), 3(c), and 3(d) illustrate the XPS spectra of the CoC@NiC sample in accordance with an embodiment of the present invention. FIG. 3 (a) shows a survey scan, FIG. 3(b) shows the Co 2p, FIG. 3(c) shows the Ni 2p, and FIG. 3(d) shows the C 1s. To get information about the chemical bonding states of elements on the obtained material, the X-ray photoelectron spectroscopy (XPS) analysis is performed. The XPS survey scan spectrum of the CoC@NiC is a clearly evidence for the occurrence of Ni, Co, C and O elements absent other impurities (FIG. 3a). The narrow scan XPS spectra of elements in CoC@NiC are shown in FIG. 3(a)-3(d).

The Co 2p spectrum is deconvoluted into multiple peaks equivalent to Co $2p_{3/2}$ and Co $2p_{1/2}$, presenting that the Co exists in more than one oxidation state FIG. 3(b). In the Co $2p_{3/2}$ XPS spectrum, the peak at 777.9 eV is attributed to the metallic Co°, possibly produced during calcination in an inert atmosphere at high temperatures. The peak situated at 779.3 eV corresponds to the $Co^{2+}$—C phase, whereas the peak at 782.9 eV is attributed to $Co^{2+}$ state, which might come from Co metal's surface contact with moisture in the air. Therefore, it is proved from these results that the inert atmosphere $N_2$ gas and high-temperature carbonization of the PANI endorse the formation of metallic carbides.

In accordance with an embodiment of the present invention, a similar process is done for the Ni 2p spectrum (FIG. 3(c)). The Ni $2p_{3/2}$ peak is deconvoluted into three peaks corresponding to the metallic Ni° peak at 852.8 eV, $Ni^{2+}$ peak at 854.7 eV and a peak at 856.4 eV for $Ni^{3+}$ state. The presence of metallic Ni postulates the partial reduction of Ni during carbonization in the inert atmosphere at the high temperatures improving the electrical conductivity and electrochemical performance. The Ni $2p_{3/2}$ peak is deconvoluted into the $Ni^{2+}$ and $Ni^{3+}$ states at 872.2 and 874.4 eV, respectively. Surprisingly, the PANI carbonization forms abundant carbon in the material, further confirmed by the C 1s spectrum. The C 1s spectrum (FIG. 3(d)) shows the occurrence of four different kinds of carbon species, C-M (281.1 eV), C=C (284.3 eV), C—C (287.9 eV) and C=O (290.2 eV).

Figure 4A:
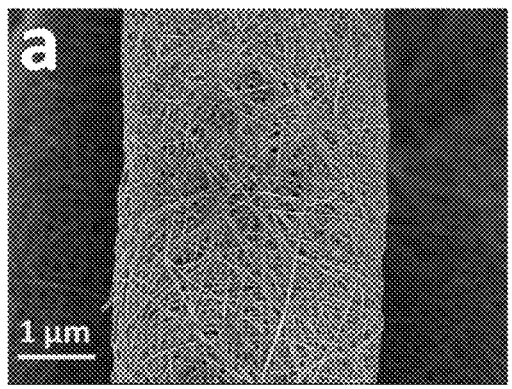
FIGS. 4(a), and 4(b) display a FESEM image for a PANI and a CoNi@PANI/CC, respectively, in accordance with an embodiment of the present invention.
Figure 4B:
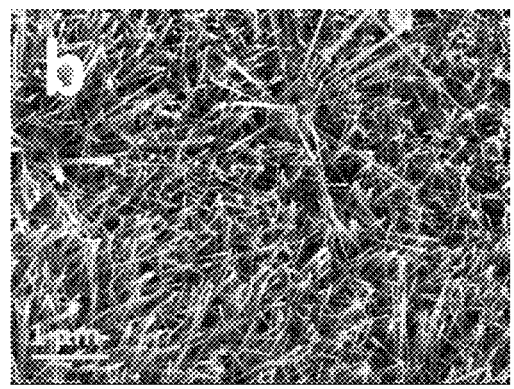

FIGS. 4(a), and 4(b) display a FESEM image for the PANI and the CoNi@PANI/CC, respectively, in accordance with an embodiment of the present invention. The surface morphologies of the prepared materials are analyzed using scanning electron microscopy (SEM). The SEM images for the PANI show that the CC substrate is uniformly coated by the PANI nanowires (FIG. 4(a)). After the hydrothermal growth of Ni—Co hydroxide precursors over the PANI nanowires, the PANI/CC substrate surface is densely covered by the Ni—Co hydroxide precursors. The SEM image (FIG. 4(b)) reveals that the Ni—Co hydroxide precursor reflects the nanowires-like morphology, which is standing perpendicularly developing hierarchical arrays.

FIGS. 5(a), 5(b) and 5(c) display the FESEM images of the NiC, CoC CoC@NiC architectures following the carbonization under nitrogen atmosphere, respectively, in accordance with an embodiment of the present invention. The NiCo/PANI precursor is fully converted into the corresponding metal carbides. All the metal carbides show particle structures, the particles have the propensity to agglomerate in the stacked cluster and particle size dispersal is nonuniform. The precise observation seems that the particles in FESEM show that the agglomerated particles have spherical to faceted morphology and the size varies from 80-200 nm.

FIG. 6 illustrates an EDS spectrum for the CoC@NiC, in accordance with an exemplary embodiment of the present invention. The EDS spectrum reveals the presence of Ni, Co, C, and O elements in the material with 11.21, 8.45, 78.26, and 2.08 At % for Ni, Co, C, and O, respectively.

FIGS. 7(a), 7(b), and 7(c) are comparative curves for a CV, a GCD, and an EIS plots for the NiC, the CoC, and the CoC@NiC electrodes, respectively at the same scan rate and current density, 7(d) illustrates the CV curves for the CoC@NiC electrode at different scan rates, 7(e) shows the GCD curves for the CoC@NiC electrode at different current densities and 7(f) plot of the variation of specific capacity with respect to current density, in accordance with an embodiment of the present invention.

In accordance with an embodiment of the present invention, the electrochemical performance of the prepared materials as electrodes is evaluated in a standard three-electrode configuration with 2 M KOH as the electrolyte gel. Firstly, the CV measurements for the NiC, CoC, and CoC@NiC electrodes are performed at a constant scan rate of 100 mV s-1 in a potential window of 0-0.6 V (vs. Hg/HgO) as depicted in FIG. 7(a). All the comparative CV profiles show superior CV integrated area and current response along with leading redox pairs. In contrast with the NiC and CoC electrodes, the CoC@NiC electrode demonstrates a larger CV curve area and higher current densities at the same scan rate of 100 mV s-1, indicating the higher charge storage capacity of the active material. FIG. 7(b) demonstrates the GCD curves for the NiC, CoC, and CoC@NiC electrodes at a similar current density of 1 A g-1 in a potential range of 0-0.5 V (vs. Hg/HgO).

The charge-discharge performance of all electrodes demonstrates its characteristic redox features that match the CV results. Further, the discharge time for the CoC@NiC electrode is longer compared to the NiC and CoC electrodes, validating that the CoC@NiC electrode possesses a higher specific capacity. The electrochemical impedance spectroscopy (EIS) analysis is a commonly used technique to assess the resistance of electrodes. FIG. 7(c) validates the Nyquist plots for the NiC, CoC, and CoC@NiC electrodes in a frequency region of 0.1 Hz to 100 kHz at a constant applied voltage of 10 mV. The Nyquist plots show the high-frequency region associated with the equivalent series resistance (Rs), which combines the solution resistance, interface resistance of active material to the current collector, and intrinsic resistance of active electrode material.

The straight line in the low-frequency area is associated with diffusion resistance. The Nyquist plots of the NiC, CoC, and CoC@NiC electrodes reveal resistance of 0.88, 0.83, and 0.79 Ωcm-2, respectively. The comparative CV, GCD, and EIS results indicate the highest electrochemical performance with higher electrical conductivity and outstanding energy storage performance of the CoC@NiC electrode. The results also signify the enhanced charge transportation after the carbonization process, during carbonization the material becomes more metallic. Hence the CoC@NiC electrode has the best electrochemical activity, and the three-electrode measurements are performed to determine the capacity, rate capability, and energy storage features.

In accordance with an embodiment of the present invention, the specific capacity and rate performance of the CoC@NiC electrode are evaluated. Further, the CV and GCD measurements are performed at different scan rates and current densities. The CV curves for the CoC@NiC electrode recorded scan rates from 5 to 100 mV s$^{-1}$ are shown in FIG. 7(d). All the CV curves depict pair of redox peaks in both cathodic and anodic sides, indicating the redox features of the active material. The enhancement in the CV curve area with scan rates is clearly observed and identifies the outstanding rate capability.

In accordance with an embodiment of the present invention, the current response enhances with the increase in scan rate, suggesting the improved kinetic features of the electrode and overall utilization of active electrode material. The GCD curves for CoC@NiC electrode at a different current density from 1 to 20 A g$^{-1}$ are presented in FIG. 7(e). A nontriangular nature of the GCD curves illustrates the charge storage owing to the faradaic reactions of the active material. At lower current densities, longer discharge time is observed whereas it decreases for higher current densities. The specific capacity for the CoC@NiC electrode is evaluated from the discharge part of the GCD curves as presented in FIG. 7(f). The CoC@NiC electrode demonstrates a maximum specific capacity of 184 mA h g-1 at the current density of 1 A g-1. Surprisingly, the electrode maintained 67.11% of initial capacity when the current density approaches 20 A g$^{-1}$, hence it shows the excellent rate capability of the CoC@NiC electrode.

In accordance with an embodiment of the present invention, the overall high electrochemical performance of the CoC@NiC electrode is due to the following reasons:
  i) The different heteroatoms, such as Co, Ni, and C in the unique structure of CoC@NiC electrode offer numerous oxidation states and, thereby electroactive sites for efficient ion diffusion,
  ii) the stacked design of CoC@NiC architectures directly on the CC substrate reduces the dead volume and resistance arising from the additives,
  iii) the prepared nanostructure composed of stacked nanoparticles offers numerous electroactive sites as well as expressways for electron diffusion/transportation, and
  iv) the preparation of the metal carbides reduces the electronic states of the CoC@NiC electrode, which thus helps to improve the electrical conductivity and electrochemical performance.

Figure 8:
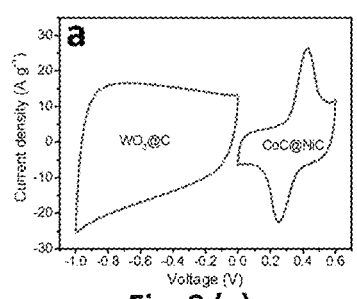
FIG. 8 (a) illustrates a CV profile for the CoC@NiC and a $WO_3$@C electrodes at a scan rate of 100 mV $s^{-1}$, 8(b) illustrates a CV curve for CoC@NiC//$WO_3$@C ASCs measured at different voltage windows at a scan rate of 100 mV $s^{-1}$, 8(c) illustrates a CV curve for CoC@NiC//$WO_3$@C ASCs at different scan rates, 8(d) illustrates a GCD curve for CoC@NiC//$WO_3$@C ASCs at different current densities, 8(e) illustrates a plot of the specific capacitance versus current density and 8(f) illustrates a Nyquist plot for the CoC@NiC//$WO_3$@C ASCs.
Figure 8:
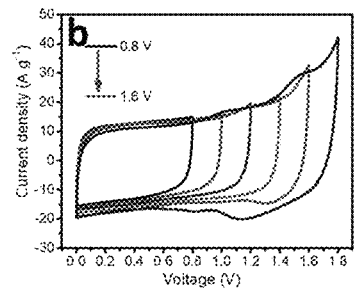
Figure 8:
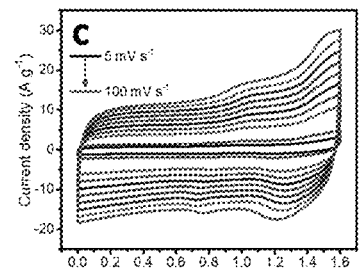
Figure 8:
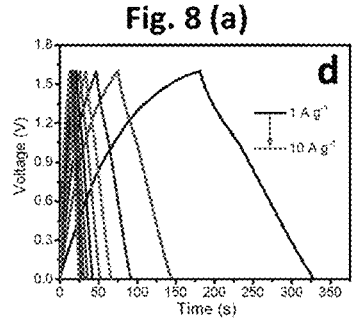
Figure 8:
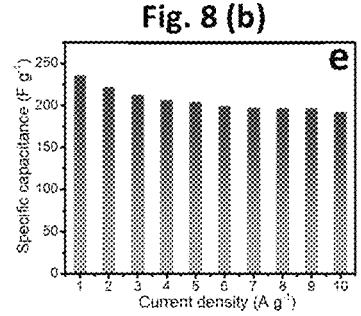
Figure 8:
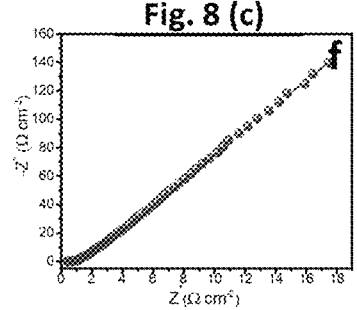

FIG. 8 (a) illustrates a CV profile for the CoC@NiC and WO3@C electrodes at a scan rate of 100 mV s$^{-1}$, 8(b) illustrates a CV curve for CoC@NiC//WO$_3$@C ASCs measured at different voltage windows at a scan rate of 100 mV s$^{-1}$, 8(c) illustrates a CV curve for CoC@NiC//WO$_3$@C ASCs at different scan rates, 8(d) shows a GCD curve for CoC@NiC//WO$_3$@C ASCs at different current densities, 8(e) illustrates a plot of the specific capacitance versus current density and 8(f) illustrates a Nyquist plot for the CoC@NiC//WO$_3$@C ASCs.

To illustrate the feasibility of the obtained CoC@NiC electrode for commercial applications, the asymmetric solid-state supercapacitors (ASCs) are fabricated by utilizing the CoC@NiC as the positive electrode, the WO$_3$@C as the negative electrode, and the PVA/KOH as the electrolyte gel. The comparative CV profiles of CoC@NiC and WO3@C at an identical scan rate of 100 mV s-1 in their corresponding positive and negative potential window are presented in FIG. 8(a). Before the fabrication of ASCs cells, charge balancing between positive and negative electrodes is essential to get superior electrochemical activity. Therefore, the mass ratio between the CoC@NiC and WO$_3$@C is adjusted to 1:2 to get a wider voltage window and energy storage performance for the ASCs cell.

To estimate the operating voltage window for the CoC@NiC//WO3@C ASCs, a CV test is performed at various voltage windows. FIG. 8(b) represents the CV curves for the CoC@NiC//WO3@C ASCs recorded at voltage windows from 0-0.8 to 0-1.8 V at a fixed sweep rate of 100 mV s-1. The appearance of small redox peaks in the CV curves at both cathodic and anodic regions indicates the reversible redox reactions of active electrode materials. The energy storage capacity of the CoC@NiC//WO3@C ASCs also increases with an increase in the voltage window. Furthermore, the current density and CV curve area enhance with the voltage window without any noticeable distortion up to voltage of 1.6 V, after that, distortion and polarization are observed for 1.8 V, and the operative voltage of the constructed ASCs is 1.6 V.

In accordance with an embodiment of the present invention, the rate capability of obtained CoC@NiC//WO3@C ASCs is calculated. Further, the CV and GCD test measurements are performed in the voltage window of 0 to 1.6 V at different scanning rates. FIG. 8(c) represents the CV curves measured at different scan rates from 5 to 100 mV s$^{-1}$. The CV profiles at all the scan rates show identical shapes with small pair of two redox peaks along both the cathodic and anodic sides, signaling the highest SCs performance. As clearly observed from the figure, even at a high scan rate of 100 mV s$^{-1}$ outline of the CV curve was maintained well, devoid of any deviation to the CV curve recorded at a lower scan rate, indicating the remarkable reversibility and good compatibility of active electrodes with the electrolyte.

In accordance with an embodiment of the present invention, the GCD curves for the CoC@NiC//WO$_3$@C ASC in the voltage range of 0 to 1.6 V are shown in FIG. 8(d). The GCD curves reveal good symmetry and a nearly triangular nature at different current densities, suggesting the high coulombic efficiency and reversibility of the ASCs. Further, the GCD profiles are analogous to the CV results indicating a capacitive characteristic of the CoC@NiC//WO$_3$@C ASC. The specific capacitance is calculated for the CoC@NiC//WO$_3$@C ASC, based on the discharge part of GCD curves as presented in FIG. 8(e). The CoC@NiC//WO$_3$@C ASC exhibits the highest specific capacitance of 235 F g$^{-1}$ at 1 A g$^{-1}$ and further, it is maintained to the 191.7 F g$^{-1}$ at 10 A g$^{-1}$ with a rate performance of 81%. The impedance analysis for the ASCs illustrates the Rs of 0.4Ω, [FIG. 8(f)]. The minimal resistance value for the CoC@NiC//WO$_3$@C ASC reveals the fast redox kinetics in the active materials and the electrolyte ions and the good compatibility of active materials with the PVA-KOH electrolyte gel.

Figure 9A:
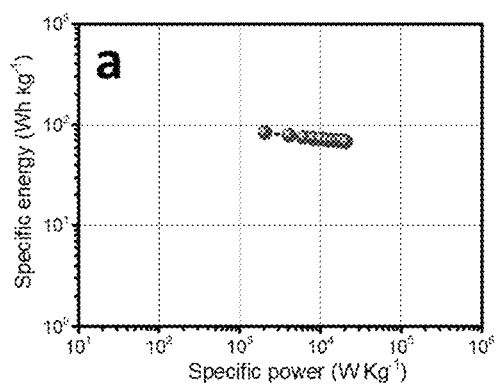
FIG. 9(a) illustrates a Ragone plot for the CoC@NiC//$WO_3$@C ASCs, and 9(b) illustrates a plot of the capacitance retention with cycles number for the CoC@NiC//$WO_3$@C ASCs, in accordance with an embodiment of the present invention.
Figure 9B:
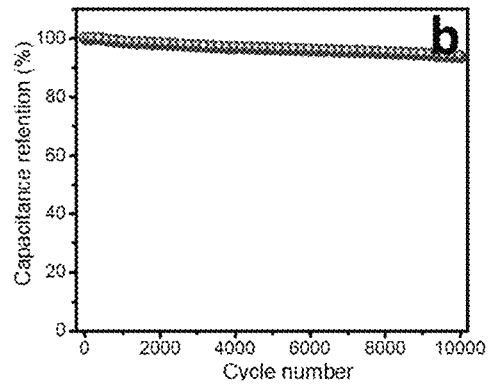

FIG. 9(a) illustrates a Ragone plot for the CoC@NiC//WO$_3$@C ASCs, and 9(b) shows a plot of the capacitance retention with cycles number for the CoC@NiC//WO$_3$@C ASCs, in accordance with an embodiment of the present invention. The specific power and energy for the ASCs are computed from the capacitance of the ASCs. FIG. 9(a) illustrates the Ragone plot showing the specific energy and specific power of the CoC@NiC//WO3@C ASC. The CoC@NiC//WO3@C ASC exhibits the highest specific energy of 83.5 Wh kg$^{-1}$ at specific power of 2048 W kg-1. Further, the ASCs held specific energy of 68.2 Wh kg-1 at a high specific power of 20480 W kg$^{-1}$, indicating that the prepared ASC delivers ultrahigh energy as well as higher power performance. Moreover, the cyclic performance of present ASCs is evaluated at 10 A g-1 over 10 000 cycles. Further, the ASCs illustrate the highest cycle stability besides capacity retention of 92.5% [FIG. 9(b)], indicating the reversibility of active electrodes of the CoC@NiC//WO$_3$@C ASC.

In accordance with another advantageous embodiment of the present invention, a columbic efficiency of the asymmetric supercapacitors is about 100%. Further, the asymmetric supercapacitors provide fast charging, ultrahigh energy density, and ultrahigh power density. Further, the asymmetric supercapacitors show high cycling stability.

In accordance with another advantageous embodiment of the present invention, asymmetric supercapacitors are used in many real-time applications that, are any of solar energy storage, a portable electronic device, an automobile, a transportation devices, like. It should be noted that the invention has been described with reference to particular embodiments and that the invention is not limited to the embodiments described herein.

Embodiments are described at least in part herein with reference to flowchart illustrations and/or block diagrams of methods, systems, and computer program products and data structures according to embodiments of the disclosure. It will be understood that each block of the illustrations and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

The invention claimed is:

1. An asymmetric supercapacitor comprising:
a positive electrode, wherein the positive electrode comprises CoC@NiC;
a negative electrode, wherein the negative electrode comprises WO$_3$@C; and
an electrolyte gel, wherein the electrolyte gel is a poly (vinyl alcohol)/Potassium hydroxide (PVA/KOH).

2. The asymmetric supercapacitor of claim 1, wherein the asymmetric supercapacitor works in a voltage range of 0-1.6 Volt (V).

3. The asymmetric supercapacitor of claim 1, wherein the asymmetric supercapacitor delivers a specific energy of 83.55 Wh kg$^{-1}$ at a specific power of 2048 W kg$^{-1}$.

4. The asymmetric supercapacitor of claim 1, wherein the asymmetric supercapacitor shows a higher cycle life with capacity retention of 91.3% over 10,000 cycles.

5. The asymmetric supercapacitor of claim 1, wherein a Columbic efficiency of the asymmetric supercapacitor is about 100%.

6. The asymmetric supercapacitor of claim 1, wherein the asymmetric supercapacitor is used in solar energy storage, a portable electronic device, an automobile, or a transportation device.

* * * * *